US007871669B2

(12) United States Patent
Lin

(10) Patent No.: US 7,871,669 B2
(45) Date of Patent: Jan. 18, 2011

(54) METHOD FOR ACHIEVING A DURABLE TWO-TONE FINISH ON A VEHICLE

(75) Inventor: Jun Lin, Troy, MI (US)

(73) Assignee: E.I. du Pont de Nemours and Company, Wilmington, DE (US)

(*) Notice: Subject to any disclaimer, the term of this patent is extended or adjusted under 35 U.S.C. 154(b) by 1115 days.

(21) Appl. No.: 10/929,238

(22) Filed: Aug. 30, 2004

(65) Prior Publication Data

US 2006/0045965 A1 Mar. 2, 2006

(51) Int. Cl.

| | |
|---|---|
| ***B05D 5/06*** | (2006.01) |
| ***B05D 7/16*** | (2006.01) |
| ***B05D 1/32*** | (2006.01) |
| ***B05D 1/36*** | (2006.01) |
| ***B05D 3/02*** | (2006.01) |
| *C08G 77/00* | (2006.01) |

(52) U.S. Cl. ........................ 427/258; 427/261; 427/282

(58) Field of Classification Search ................. 427/258, 427/261, 282; 528/10, 31, 32, 33

See application file for complete search history.

(56) References Cited

U.S. PATENT DOCUMENTS

| | | | | |
|---|---|---|---|---|
| 4,075,141 | A | 2/1978 | Porter, Jr. et al. | |
| 4,147,688 | A | 4/1979 | Makhlouf et al. | |
| 4,180,489 | A | 12/1979 | Andrew et al. | |
| 4,415,681 | A | 11/1983 | Horvath | |
| 4,591,533 | A | 5/1986 | Antonelli et al. | |
| 5,283,084 | A | 2/1994 | Lau | |
| 5,747,590 | A | 5/1998 | Corcoran et al. | |
| 6,034,166 | A * | 3/2000 | Jackson et al. | 524/495 |
| 6,080,816 | A | 6/2000 | Gregorovich et al. | |
| 6,239,212 | B1 | 5/2001 | Green | |
| 6,355,722 | B2 * | 3/2002 | Poth et al. | 524/601 |

(Continued)

FOREIGN PATENT DOCUMENTS

| | | | |
|---|---|---|---|
| EP | 0995778 | A2 | 4/2000 |
| WO | 92/05225 | A1 | 4/1992 |
| WO | 00/55229 | A2 | 9/2000 |
| WO | 05/33233 | A2 | 4/2005 |

OTHER PUBLICATIONS

Beeler, et al., "Super High Solids Coatings: Reactive Monomer Molecular Structures", Polymer Preprints, 2003, 44(1), pp. 259-260.

(Continued)

*Primary Examiner*—William Phillip Fletcher, III
(74) *Attorney, Agent, or Firm*—Brian J Myers

(57) ABSTRACT

A method for producing a multilayer two-tone finish on a substrate such as an automobile or truck body or parts thereof. The method includes the steps of applying two different primers to a substrate, applying an accent color to a portion of the substrate and baking the applied coatings. The accent area is then masked and a main color is applied to the unmasked portion of the substrate. The mask is then removed from the accent color area, a clearcoat is applied to the applied main and accent colors and the substrate is baked to dry and cure the applied coating compositions. The clearcoat composition carbamate material, a curing agent and a hydroxy functional silane component. The method and the clearcoat composition provides a substantially durable and wrinkle free appearance and excellent adhesion to waterborne and solventborne basecoats, baked or unbaked.

13 Claims, 2 Drawing Sheets

U.S. PATENT DOCUMENTS

| | | | | |
|---|---|---|---|---|
| 6,376,016 | B1 * | 4/2002 | Farquhar et al. | 427/258 |
| 6,391,968 | B1 | 5/2002 | Ohrbom et al. | |
| 6,451,930 | B1 | 9/2002 | Burgman et al. | |
| 2003/0170468 | A1 | 9/2003 | Paquet, Jr. et al. | |
| 2003/0232222 | A1 | 12/2003 | Anderson et al. | |
| 2004/0157980 | A1 * | 8/2004 | Fox et al. | 524/547 |
| 2004/0175551 | A1 * | 9/2004 | Dunlop et al. | 428/212 |

OTHER PUBLICATIONS

Office Action dated May 14, 2008 in U.S. Appl. No. 10/929,239, filed Aug. 30, 2004.

Office Action dated Dec. 4, 2008 in U.S. Appl. No. 10/929,239, filed Aug. 30, 2004.

Advisory Action dated Feb. 26, 2009 in U.S. Appl. No. 10/929,239, filed Aug. 30, 2004.

Office Action dated Sep. 21, 2009 in U.S. Appl. No. 10/929,239, filed Aug. 30, 2004.

Office Action dated Apr. 5, 2010 in U.S. Appl. No. 10/929,239, filed Aug. 30, 2004.

* cited by examiner

3 Wet Coat Integrated Two Tone Paint Process

Total of 5 Coating Steps and 2 Bakes

Conventional Two Tone Paint Process

Total of 6 Coating Steps and 3 Bakes

METHOD FOR ACHIEVING A DURABLE TWO-TONE FINISH ON A VEHICLE

BACKGROUND OF THE INVENTION

This invention relates to coating materials and methods for producing a multilayer finish, particularly a multilayer two-tone, chip resistant finish, which has improved durability, on a substrate such as an automobile or truck.

Transportation vehicles, such as automobile and truck bodies, are treated with multiple layers of coatings which enhance the appearance of the vehicle and also provide protection from corrosion, scratch, chipping, ultraviolet light, acid rain and other environmental conditions. Basecoat/clearcoat finishes for automobiles and trucks have been commonly used over the past two decades, in a "wet-on-wet" application, i.e., the clear coat is applied before the base coat is completely cured. In typical fashion, the basecoat/clearcoat finish is typically applied over a previously cured primer surfacer coated substrate. It is also common to apply a special chip resistant primer in the low body areas of automobile and truck bodies, during the primer surfacer application stage.

The desire for even more unique and attractive color styling has led the automobile and truck Original Equipment Manufacturers (OEM) to produce vehicles with multiple colored, or "two-toned," finishes. A typical procedure used to produce a chip resistant "two-tone" finish on a vehicle substrate involves the following:

I) Application of a lower body chip resistant primer over an electrocoated vehicle substrate;
II) Application of a primer surfacer to the entire substrate;
III) Bake curing the prime coated substrate;
IV) Applying a main body color, which is typically a waterborne basecoat to the vehicle substrate;
V) Applying clearcoat over the main color basecoat;
VI) Bake curing and covering with a protective membrane, the upper body main color basecoat/clearcoat finish area of the substrate;
VII) Applying accent color, which is typically a solventborne basecoat, in accent area
VIII) Applying accent clear coat in accent area, which is typically the same clear coat as used in step (V) above
IX) Bake curing the accent basecoat/clearcoat finish, and removing the protective membrane.

One disadvantage with such a process is that the clearcoats in use nowadays experience compatibility problems with a variety of basecoat formulations. Most clearcoats do not have good appearance and adhesion to both waterborne and solventborne basecoats. Commonly used waterborne basecoats for the main body portion, particularly those containing free amines, often appear to cause unacceptable wrinkling and poor appearance in subsequently applied and cured clearcoat formulations. It has been found that a clearcoat composition containing polymeric high imino melamine can provide good appearance and wrinkle resistance over amine containing waterborne basecoats. However, it has also been found that polymeric high imino aminoplast resins can lead to poor scratch and mar resistance and unacceptable adhesion for over baked solvent or waterborne basecoats, which are now more popularly practiced in the automotive assembly plants where basecoats need to be sprayed, such as in two-tone operations, over a wet primer in the primer spray booth and baked in the former primer only ovens. For a successful two-tone process, the clearcoat composition must be compatible with both waterborne and solventborne basecoats and provide acceptable levels of appearance and durable adhesion to the underlying basecoat. Furthermore, the auto plants are now trying to elevate the two-tone process from the lower body of the truck to the mid- or high-line of the vertical surface. Durability of finishes for adhesion performance becomes even more critical.

Therefore, there is a need for a coating composition and application methods which provide multiple colored two-tone finishes having improved durability and adhesion over baked substrates without sacrificing wrinkle resistance over waterborne basecoats. There is also a desire to carry out this method in a minimum number of coating steps and bake curing cycles.

SUMMARY OF THE INVENTION

The present invention is directed to coating materials, in particular, novel clear coating compositions, particularly useful for producing multiple colored, two tone, chip resistant finishes which have improved durable adhesion without sacrificing wrinkle resistance. The clear coating composition can be used over a variety of basecoats, including both waterborne and solvent borne basecoat compositions, as well as medium and high solids versions thereof, without suffering from the drawbacks mentioned above. The clearcoat is particularly compatible over basecoats which are fully baked as a result of basecoat-primer wet-on-wet sprayout processes.

The clear coat composition used herein, which provides a transparent top coat over the entire two-toned vehicle, is a solvent borne composition comprising a film-forming binder and an organic liquid carrier; wherein the film-forming binder contains:

(A) a curable film-forming component having a plurality of carbamate groups;
(B) one or more curing or crosslinking agents for component (A) comprising at least one monomeric alkylated melamine formaldehyde resin and preferably containing essentially no polymeric melamine;
(C) a hydroxyl functional silane component having at least one hydrolyzable silane group and having a hydroxyl value of about 45 or above; and
(D) an optional second hydroxyl functional silane component having a hydrolyzable silane group and having a lower (when compared to component (C)) hydroxyl value of about 44 or smaller, preferably 40 or smaller.

The present invention is also directed to a method for achieving a multiple colored two-tone finish, which is durable, has excellent appearance, and is substantially free of wrinkling, on a variety of substrates, typically on portions of automobile and truck exteriors such as on window and door frames, and other body parts, preferably in only two curing cycles. The method comprises:

(1) applying a chip resistant primer coating composition with holdout capability to an accent area of a substrate, typically previously painted with an electrodeposition primer composition;
(2) applying a primer surfacer coating composition to an adjacent non-accent area of the substrate;
(3) applying an accent color basecoating composition, typically a solventborne basecoat, wet-on-wet to the chip resistant primer coating composition in the accent area;
(4) curing the composite coated substrate from step (3) in a first bake;
(5) covering the accent area with a protective membrane;
(6) applying a main color basecoating composition, typically a waterborne basecoat, more typically one containing free amines, over the unmasked area;

(7) removing the protective membrane from the accent area; and then (8) applying the novel solventborne clear coating composition as described above wet-on-wet to all faces of the substrate from step (7); and then (9) curing the composite two-toned coated substrate from step (8) in a second bake, to provide a multi-layer two-tone coated article which is substantially free of wrinkling.

The method of this invention can be operated in a single pass continuous in-line paint application process or in stationary batch process, at a vehicle assembly plant.

The method provides a multilayer two-tone coated substrate, such as a multilayer coated vehicle body or part thereof, that has a substantially unwrinkled appearance, excellent scratch and mar resistance, as well as exceptional levels of durability and etch resistance, and also has improved clearcoat adhesion to both waterborne and solvent borne basecoats.

A coated substrate having a two-tone composite coating prepared according to the present method also forms part of this invention.

DETAILED DESCRIPTION OF THE INVENTION

Figure 1:
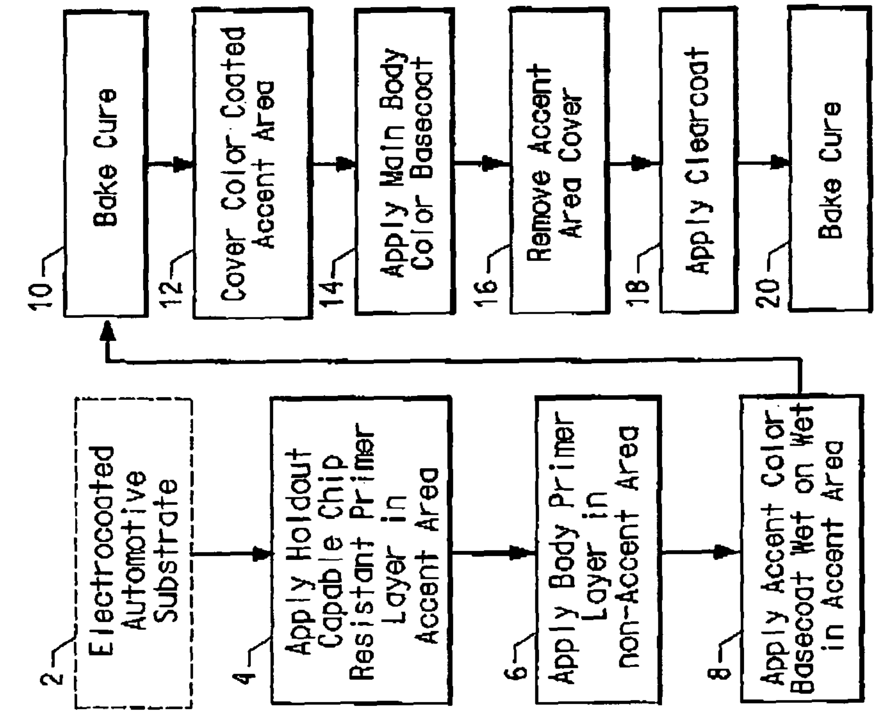
FIG. 1 is a general flow diagram of a two-tone coating scenario illustrating a use of an embodiment of the present invention.

The present invention is directed to coating materials and processes for forming a multi-colored two-tone composite finish which is exceptionally durable, substantially wrinkle-free, and has a robust adhesion on a variety of substrates, especially on portions of automobile and truck bodies and parts thereof. The process of the present invention can be run in a batch or continuous process. Ideally, it is designed to be run in existing primer surfacer/basecoat/clearcoat painting facilities, such as continuous in-line or modular batch facilities, located at an automotive assembly plant, without the need for double processing of a vehicle through the paint line or the need to extend the painting time.

By replacing the conventional clearcoat with a clearcoat having improved compatibility with both waterborne and solventborne basecoats, the durability of the finished article can be substantially improved.

The term "compatible" as used herein refers to a clearcoat that can deliver a substantially wrinkle free appearance over both the solventborne and waterborne basecoats used in the two-tone process, as well as excellent intercoat adhesion over said basecoats after the finish is baked and cured.

Also, by replacing the conventional accent area chip resistant urethane primer with a "holdout" capable chip resistant primer composition capable of wet-on-wet application with a basecoat, the number of steps and curing cycles in the conventional two-tone painting process can be reduced, yet without sacrificing chip resistant performance in the accent area.

The term "holdout capable" means a recently applied uncured initial coating possesses intermixing resistance and maintains a substantial interfacial boundary when a secondary coating layer, or plurality of coatings layers, are subsequently applied over the initial coating layer. This type of multiple coating technique without curing between layers is commonly referred to as "wet-on-wet" when two wet coats are used, or "wet-on-wet-on-wet" for three wet coating layers.

By "two-tone" it is meant that a vehicle finish has two distinctly different colors. A first accent color which covers a minor portion of the vehicle's outer substrate, usually in the lower or middle vertical area. A second main body color that covers the remaining major portion of the vehicle's outer substrate.

The terminology "protective membrane" is defined as a pliable film which possesses the characteristics to cover and shield a first cured coating layer from exposure to subsequently applied second coating layer, thus maintaining the integrity of the first cured coating layer. The protective membrane may be secured in place by any practical means, such as tape, or adhesive. Such protective membranes are widely available in the marketplace. Vector Technologies of Grand Blanc, Mich., supplies a particularly useful protective membrane that has an adhesive deposited on the membrane, which is self adherent and does not require tape to secure the membrane.

As used herein, the term "plurality" shall mean an average of two or more.

Also, by the term "substantially cured" or "partially cured" is meant that, although at least some curing has occurred, further curing may occur over time.

Also, the terminology "hydrolyzable silane group" means a silyl group having the structure:

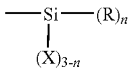

wherein this group is attached to a silyl-containing material by a silicon-carbon bond, and wherein: n is 0, 1 or 2; R is oxysilyl or unsubstituted hydrocarbyl or hydrocarbyl substituted with at least one substituent containing a member selected from the group O, N, S, P, Si; and X is a hydrolyzable moiety selected from the group $C_1$ to $C_4$ alkoxy, $C_6$ to $C_{20}$ aryloxy, $C_1$ to $C_6$ acyloxy, hydrogen, halogen, amine, amide, imidazole, oxazolidinone, urea, carbamate, and hydroxylamine.

The clear coat composition used herein to form a transparent clearcoat containing no pigments or a small amount of transparent pigment over a colored basecoat containing solid color pigments or metallic or pearl flake pigments or mixtures thereof and also to provide the exceptionally durable and substantially wrinkle free appearance is a curable carbamate-melamine-silane group containing coating. After application and at least partial cure, the composition unexpectedly demonstrates wrinkle free appearance and good intercoat adhesion over both waterborne and solventborne basecoats, even where the basecoat has been previously cured.

The clear coating composition preferably has a relatively high solids content of about 45-90% by weight of binder and correspondingly about 10-55% by weight of an organic carrier which can be a solvent for the binder or a mixture of solvents. The coating of the present invention is also preferably a low VOC (volatile organic content) coating composition, which means a coating that includes less than 0.6 kilograms of organic solvent per liter (5 pounds per gallon) of the composition as determined under the procedure provided in ASTM D3960.

The film-forming portion of the present coating composition, comprising the polymeric, oligomeric and other film-forming components, is referred to as the "binder" or "binder solids" and is dissolved, emulsified or otherwise dispersed in an organic solvent or liquid carrier. The binder solids generally include all the film-forming components that contribute to the solid organic portion of the cured composition. Generally, catalysts, pigments, or chemical additives such as stabilizers are not considered part of the binder. Non-binder solids other than pigments usually do not amount to more than about 5-10% by weight of the composition. In this disclosure, the term "binder" or "binder solids" includes the curable film-forming, carbamate materials, the curing agents, the reactive silane components, and all other optional film-forming components.

The coating composition of this invention contains a novel combination of binder ingredients which render the composition compatible with a broad range of coating components.

The first material in the film forming binder portion of the coating is a curable film-forming carbamate group containing component (A). Curable film forming component (A) may be present in the coating composition in amounts of from about 5 to 60%, preferably from 10 to 55%, by weight, based on the weight of the binder.

Curable film-forming carbamate group containing component (A) may generally be polymeric or oligomeric and will generally comprise an average of at least 2 reactive carbamate groups per molecule. The carbamate groups may be primary or secondary, although this invention is particularly directed to carbamate materials with secondary carbamate groups. Also in this invention, lower molecular weight materials, such as oligomers, are generally preferred.

Such oligomeric carbamate functional compounds will generally have a weight average molecular weight ranging from about 75-2,000, and preferably from about 75-1,500. All molecular weights disclosed herein are determined by GPC (gel permeation chromatography) using a polystyrene standard. These lower molecular weight materials can be prepared in a variety of ways, which are well known in the art.

In a preferred embodiment, these lower molecular weight materials are prepared by reacting a polyisocyanate, preferably an aliphatic polyisocyanate, with a monofunctional alcohol to form an oligomeric compound having multiple secondary carbamate groups, as described in WO 00/55229, the disclosure of which is incorporated herein by reference. This reaction is performed under heat, preferably in the presence of catalyst as is known in the art.

Various polyisocyanate compounds can be used in the preparation of these secondary carbamate compounds. The preferable polyisocyanate compounds are isocyanate compounds having 2 to 3 isocyanate groups per molecule. Typical examples of polyisocyanate compounds are, for instance, 1,6-hexamethylene diisocyanate, isophorone diisocyanate, 2,4-toluene diisocyanate, diphenylmethane-4,4'-diisocyanate, dicyclohexylmethane-4,4'-diisocyanate, tetramethylxylidene diisocyanate, and the like. Trimers of diisocyanates also can be used such as the trimer of hexamethylene diisocyanate (isocyanurate) which is sold under the tradename Desmodur® N-3390, the trimer of isophorone diisocyanate (isocyanurate) which is sold under the tradename Desmodur® Z-4470 and the like.

Polyisocyanate functional adducts can also be used that are formed from any of the forgoing organic polyisocyanate and a polyol. Polyols such as trimethylol alkanes like trimethylol propane or ethane can be used. One useful adduct is the reaction product of tetramethylxylidene diisocyanate and trimtheylol propane and is sold under the tradename of Cythane® 3160. When the curable carbamate functional resin of the present invention is used in exterior coatings, the use of an aliphatic or cycloaliphatic isocyanate is preferable to the use of an aromatic isocyanate, from the viewpoint of weatherability and yellowing resistance.

Any monohydric alcohol can be employed to convert the above polyisocyanates to secondary carbamate groups. Some suitable monohydric alcohols include methanol, ethanol, propanol, butanol, isopropanol, isobutanol, hexanol, 2-ethylhexanol, and cyclohexanol.

In another embodiment, the lower molecular weight secondary carbamate materials can be formed by reacting a monofunctional isocyanate, preferably an aliphatic monofunctional isocyanate, with a polyol, as will be appreciated by those skilled in the art.

Typical of such above-mentioned low molecular weight secondary carbamate materials are those having the following structural formulas I-III:

(I)

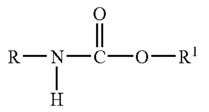

(II)

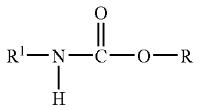

(III)

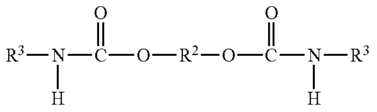

where R is a multifunctional oligomeric or polymeric material; $R^1$ is a monovalent alkyl or cycloalkyl group, preferably a monovalent $C_1$ to $C_{12}$ alkyl group or $C_3$ to $C_6$ cycloalkyl group, or a combination of alkyl and cycloalkyl groups; $R^2$ is a divalent alkyl or cycloalkyl group, preferably a divalent $C_1$ to $C_{12}$ alkyl group or $C_3$ to $C_6$ cycloalkyl group, or a combination of divalent alkyl and cycloalkyl groups; and $R^3$ is either R or $R^1$ as defined above.

Carbamate functional polymers, particularly those with secondary carbamate groups, may also be used in the practice of this invention. Such polymers are well-known in the art. Such polymers can be prepared in a variety of ways and are typically acrylic, polyester, or polyurethane containing materials with pendant and/or terminal carbamate groups. Acrylic polymers are generally preferred in automotive topcoats.

Mixtures of the polymeric and oligomeric carbamate functional compounds may also be utilized in the coating composition of the present invention.

The coating composition also includes, as part of the film-forming binder, one or more curing or crosslinking agents (B). These materials preferably have an average of 2 or more functional groups reactive with the carbamate groups on component (A). In general, crosslinking agent (B) may be present in the coating composition in amounts of from about 15 to 45%, preferably 20 to 40%, by weight, based on the weight of the binder.

A number of crosslinking materials are known that can react with carbamate groups and form urethane linkages in the cured coating, which linkages, are desirable for their durability, resistance to attack by acid rain and other environmental pollutants, and scratch and mar resistance. These include aminoplast resins such as melamine formaldehyde resins (including monomeric or polymeric melamine resin and partially or fully alkylated melamine resin), urea resins (e.g., methylol ureas such as urea formaldehyde resin, alkoxy ureas such as butylated urea formaldehyde resin), and phenoplast resins such as phenol/formaldehyde adducts, as well as curing agents that have isocyanate groups, particularly blocked isocyanate curing agents (e.g., TDI, MDI, isophorone diisocyanate, hexamethylene diisocyanate, an isocyanurates of these, which may be locked with alcohols or oximes), and the like, and combinations thereof.

However, it is an aspect of the invention that at least one or more curing agents (B) be a monomeric alkylated aminoplast resin, particularly a monomeric alkylated melamine formaldehyde resin, which may be fully or partially alkylated. When a monomeric alkylated melamine is used in conjunction with the other binder ingredients herein, it has been found that the cure rate of the coating of the invention can be effectively raised such that strong intercoat adhesion over baked solventborne basecoats can be achieved, without sacrificing the wrinkling resistance over waterborne basecoats.

These monomeric aminoplast crosslinking agents are well known in the art and contain a plurality of functional groups, for example, alkylated methylol groups, that are reactive with the pendant or terminal carbamate groups present in the film-forming polymer and are thus capable of forming the desired urethane linkages with the carbamate functional polymers. Most preferably, the crosslinking agent is a monomeric melamine-formaldehyde condensate that has been partially or fully alkylated, that is, the melamine-formaldehyde condensate contains methylol groups that have been further etherified with an alcohol, preferably one that contains 1 to 6 carbon atoms. Any monohydric alcohol can be employed for this purpose, including methanol, ethanol, n-butanol, isobutanol, and cyclohexanol. Most preferably, methanol, n-butanol, or isobutanaol, and blends thereof are used. Such crosslinking agents typically have a weight average molecular weight of about 500-1,500, as determined by GPC using polystyrene as the standard.

It is especially preferred herein that the monomeric melamine be a low imino aminoplast resin. Monomeric melamines having an imino content less than 20% of the total functionality, or 1.2 mole of NH per triazine ring are specially preferred and with a degree of polymerization less than 4 (i.e., 4 triazine rings linked together). More preferred are aminoplast resins having 0 (no imino groups) to 0.8 moles of NH per triazine ring. Remaining sites will preferably be alkylated with methanol, butanol, or other types of alcohol.

The aminoplast resin crosslinking agents of the forgoing type are commercially available from Cytec Industries, Inc. under the trademark Cymel® and from Surface Specialties UCB under the trade name Resimene®. The other suitable crosslinking agents such as the blocked and unlocked isocyanates are commercially available from Bayer Corporation under the trademark Desmodur®.

Of course, the crosslinking agents may be combinations of the forgoing, particularly combinations that include a monomeric alkylated melamine crosslinking agent and a blocked isocyanate crosslinking agent.

In addition to the curable carbamate functional material (A) and crosslinking component (B), the coating composition also contains, as part of the film-forming binder, a hydroxyl functional silane compound (C).

This is a key component of the composition of the present invention, as it provides for additional crosslinking through condensation type reactions. The hydroxyl functional silane component may be incorporated in the film-forming portion of the coating in an amount sufficient to achieve improved appearance over both solventborne basecoats and waterborne basecoats in absence of polymeric melamines, as well as improved intercoat adhesion over baked solvent borne basecoats and clearcoats. Typically, the hydroxyl functional silane component (C) is used in an amount ranging from about 10 to 50% by weight, preferably from about 15 to 45% by weight, based on the weight of the binder.

The hydroxyl functional silane material (C) utilized herein is a compound that contains an average of one or more hydrolyzable silyl groups and has a hydroxyl value of about 45 or higher, preferably 60 to 150. This material can be an oligomeric or polymeric material including a polysiloxane based material. In this invention, polymeric materials, especially those prepared from ethylenically unsaturated monomers which are listed hereinafter, are generally preferred.

The hydroxy functional silane polymers that preferably may be used in the practice of this invention can be prepared in a variety of ways and are typically acrylic, polyester or epoxy containing materials. Acrylic polymers are generally preferred in automotive topcoats. Such polymers will generally have a weight average molecular weight of 1,000-30,000, and preferably between 2,000 and 10,000 as determined by gel permeation chromatography (GPC) using polystyrene as the standard.

In a preferred embodiment, the hydroxy functional silane polymer (C) is the polymerization product of ethylenically unsaturated monomers such as are listed hereinafter, of which from about 5 to 80% by weight, preferably 10 to 60% by weight, and more preferably 15 to 40% by weight, based on the weight of the polymer, are ethylenically unsaturated monomers which contain hydrolyzable silane functionality. The average number of hydroxyl groups on the polymer can vary; however such materials should have a hydroxyl number greater than 45, preferably ranging from about 60 to 150, and more preferably from about 80 to 120 (mg KOH/g resin solids), in order to achieve the desired film properties.

One way to prepare these polymers is to copolymerize the ethylenically unsaturated monomer having silane functionality into a polymer prepared from ethylenically unsaturated monomers. For example, silane functional groups can be incorporated into a polymer prepared from ethylenically unsaturated monomers by copolymerizing, for example, an ethylenically unsaturated silane functional monomer with a hydroxy functional non-silane containing ethylenically unsaturated monomer, such as a hydroxy functional alkyl acrylate or methacrylate, and optionally other polymerizable non-silane containing ethylenically unsaturated monomers.

Useful hydroxy functional ethylenically unsaturated monomers include, for example, hydroxy alkyl (meth)acrylates meaning hydroxy alkyl acrylates and hydroxy alkyl methacrylates having 1-4 carbon atoms in the alkyl groups such as hydroxy methyl acrylate, hydroxy methyl methacrylate, hydroxy ethyl acrylate, hydroxy ethyl methacrylate, hydroxy propyl methacrylate, hydroxy propyl acrylate, hydroxy butyl acrylate, hydroxy butyl methacrylate and the like. The presence of hydroxy functional monomers enables additional crosslinking to occur between the hydroxy groups and silane moieties on the silane polymer and/or between the hydroxy groups with other crosslinking groups (such as melamine groups) that may be present in the top coat composition, to minimize silicon stratification in the final top coat and provide optimal recoat adhesion.

Other suitable non-silane containing monomers include alkyl acrylates, alkyl methacrylates and any mixtures thereof, where the alkyl groups have 1-12 carbon atoms, preferably 2-8 carbon atoms. Suitable alkyl methacrylate monomers are methyl methacrylate, ethyl methacrylate, propyl methacrylate, butyl methacrylate, isobutyl methacrylate, pentyl methacrylate, hexyl methacrylate, octyl methacrylate, nonyl methacrylate, lauryl methacrylate and the like. Similarly, suitable alkyl acrylate monomers include methyl acrylate, ethyl acrylate, propyl acrylate, butyl acrylate, isobutyl acrylate, pentyl acrylate, hexyl acrylate, octyl acrylate, nonyl acrylate, lauryl acrylate and the like. Cycloaliphatic methacrylates and acrylates also can be used, for example, such as trimethylcyclohlexyl methacrylate, trimethylcyclohexl acrylate, isobornyl methacrylate, isobornyl acrylate, t-butyl cyclohexyl acrylate, or t-butyl cyclohexyl methacrylate. Aryl acrylate and aryl methacrylates also can be used, for example, such as benzyl acrylate and benzyl methacrylate. Of course, mixtures of the two or more of the above mentioned monomers are also suitable.

In addition to non-silane containing alkyl acrylates or methacrylates, other polymerizable monomers, up to about 50% by weight of the polymer, can be also used in the hydroxy functional silane polymer for the purpose of achieving the desired properties such as hardness, appearance, and the like. Exemplary of such other monomers are styrene, methyl styrene, acrylamide, acrylonitrile, methacrylonitrile, and the like.

The silane containing monomers that may be utilized in forming the hydroxy silane material include alkoxy silanes having the following structural formula:

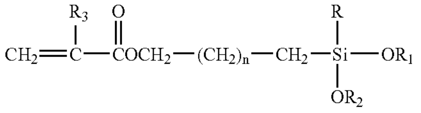

where R is either $CH_3$, $CH_3CH_2$, $CH_3O$, or $CH_3CH_2O$; $R_1$ and $R_2$ are independently $CH_3$ or $CH_3CH_2$; and $R_3$ is either H, $CH_3$, or $CH_3CH_2$; and n is 0 or a positive integer from 1 to 10. Preferably, R is $CH_3O$ or $CH_3CH_2O$ and n is 1. Typical examples of such alkoxysilanes are the acrylatoalkoxy silanes, such as gamma-acryloxypropyl trimethoxysilane and the methacrylatoalkoxy silanes, such as gamma-methacryloxypropyl trimethoxysilane (Silquest® A-174 from Crompton), and gamma-methacryloxypropyltris(2-methoxyethoxy) silane.

Other suitable alkoxy silane monomers have the following structural formula:

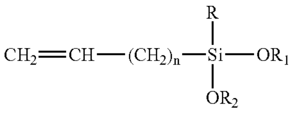

where R, $R_1$ and $R_2$ are as described above and n is 0 or a positive integer from 1 to 10. Examples of such alkoxysilanes are the vinylalkoxy silanes, such as vinyltrimethoxy silane, vinyltriethoxy silane and vinyltris(2-methoxyethoxy) silane.

Other suitable silane containing monomers are ethylenically unsaturated acryloxysilanes, including acrylatoxy silane, methacrylatoxy silane and vinylacetoxy silanes, such as vinylmethyldiacetoxy silane, acrylatopropyl triacetoxy silane, and methacrylatopropyltriacetoxy silane. Of course, mixtures of the above-mentioned silane containing monomers are also suitable.

Silane functional macromonomers also can be used in forming the hydroxy functional silane polymer. For example, one such macromonomer is the reaction product of a silane containing compound, having a reactive group such as epoxide or isocyanate, with an ethylenically unsaturated non-silane containing monomer having a reactive group, typically a hydroxyl or an epoxide group, that is co-reactive with the silane monomer. An example of a useful macromonomer is the reaction product of a hydroxy functional ethylenically unsaturated monomer such as a hydroxyalkyl acrylate or methacrylate having 1-4 carbon atoms in the alkyl group and an isocyanatoalkyl alkoxysilane such as isocyanatopropyl triethoxysilane.

Typical of such above-mentioned silane functional macromonomers are those having the following structural formula:

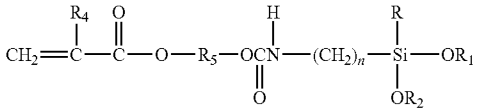

where R, $R_1$, and $R_2$ are as described above; $R_4$ is H or $CH_3$, $R_5$ is an alkylene group having 1-8 carbon atoms and n is a positive integer from 1-8.

Consistent with the above mentioned components, an example of a hydroxy functional acrylic silane polymer useful in the practice of this invention is composed of polymerized monomers of styrene, an ethylenically unsaturated alkoxy silane monomer which is either an acrylate, methacrylate or vinyl alkoxy silane monomer or a mixture of these monomers, a nonfunctional acrylate or methacrylate or a mixture of these monomers and a hydroxy alkyl acrylate or methacrylate that has 1-4 carbon atoms in the alkyl group such as hydroxy ethyl acrylate, hydroxy propyl acrylate, hydroxy butyl acrylate, hydroxy ethyl methacrylate, hydroxy propyl methacrylate, hydroxy butyl methacrylate and the like or a mixture of these monomers.

One preferred silane acrylic polymer (C) contains the following constituents: about 1-30% by weight styrene, about 5-80% by weight gamma-methacryloxypropyl trimethoxysilane, and about 1-30% by weight isobutyl methacrylate, 1-30% by weight butyl acrylate, and more than 10% by weight, more preferably about 13-34% by weight hydroxy propyl acrylate. The total percentage of monomers in the polymer equal 100%. This polymer preferably has a weight average molecular weight ranging from about 1,000 to 20,000.

One particularly preferred silane acrylic polymer contains about 25% by weight styrene, about 30% by weight gamma-methacryloxypropyl trimethoxysilane, about 25% by weight of nonfunctional acrylates or methacrylates such as trimethylcyclohexyl methacrylate, butyl acrylate, and iso-butyl methacrylate and any mixtures thereof, and about 20% by weight of hydroxy propyl acrylate.

The polymers prepared from ethylenically unsaturated monomers can be prepared by standard solution polymerization techniques, which are well-known to those skilled in the art, in which the monomers, solvent, and polymerization initiator are charged over a 1-24 hour period of time, preferably in a 2-8 hour time period, into a conventional polymerization reactor in which the constituents are heated to about 60-175°

C., preferably about 110-170° C. The ratio of reactants and reaction conditions are selected to result in a silane polymer with the desired hydroxy functionality.

The hydroxy functional silane materials can also be oligomeric in nature. These materials are well known in that art.

Mixtures of polymeric and oligomeric hydroxy functional silane compounds may also be utilized in the present invention.

In addition to the hydroxy functional silane component described above, the coating composition optionally, but preferably, further includes, as part of the binder, another hydroxy functional silane component (D) which is different from (C). This component has a lower hydroxyl value (i.e., fewer hydroxyl groups) relative to component (C).

The low hydroxyl functional silane component (D) may be incorporated in the film-forming portion of the composition in an amount sufficient to achieve primerless adhesion to windshield bonding adhesives applied on top of the clearcoat. Typically, the low hydroxy functional silane component is used in an amount ranging from 0 to about 15% by weight, preferably from about 5 to 10% by weight, based on the weight of the binder.

The low hydroxy functional silane material (D), if present, contains an average of one or more hydrolyzable silyl groups and has a hydroxyl value of less than 45, preferably in the range of about 4 to 44, with a hydroxyl value in the range of about 4 to 40 being particularly preferred. This material can be an oligomeric or polymeric material including a polysiloxane based material. In this invention, polymeric materials, especially those prepared from ethylenically unsaturated monomers which are listed hereinafter, are generally preferred. This component may prepared in the same way as described for silane component (C) using any of the monomers listed above for component (C) and have the same molecular weight ranges, with the exception that reduced amounts of hydroxy functional monomers are incorporated in this polymer during polymerization.

In a preferred embodiment, the low hydroxyl functional silane polymer (D) is the polymerization product of ethylenically unsaturated monomers such as are listed hereinabove, of which from about 10 to 97% by weight, preferably 30 to 80% by weight, and more preferably 50 to 75% by weight, based on the weight of the polymer, are ethylenically unsaturated monomers which contain hydrolyzable silane functionality. The average number of hydroxyl groups on the polymer can vary; however such materials should have a hydroxyl number smaller than 45, preferably ranging from about 44 to 4, and more preferably from about 40 to 20 (mg KOH/g resin solids), in order to achieve the desired film properties.

Consistent with the above mentioned components, an example of a high hydroxy functional acrylic silane polymer useful in the practice of this invention is composed of polymerized monomers of styrene, an ethylenically unsaturated alkoxy silane monomer which is either an acrylate, methacrylate or vinyl alkoxy silane monomer or a mixture of these monomers, a nonfunctional acrylate or methacrylate or a mixture of these monomers and a hydroxy alkyl acrylate or methacrylate that has 1-4 carbon atoms in the alkyl group such as hydroxy ethyl acrylate, hydroxy propyl acrylate, hydroxy butyl acrylate, hydroxy ethyl methacrylate, hydroxy propyl methacrylate, hydroxy butyl methacrylate and the like or a mixture of these monomers.

One preferred silane acrylic polymer (D) contains the following constituents: about 1-30% by weight styrene, about 1-96% by weight gamma-methacryloxypropyl trimethoxysilane, and about 1-30% by weight isobutyl methacrylate, 1-30% by weight butyl acrylate, and less than 10% by weight, more preferably about 1-9% by weight hydroxy propyl acrylate. The total percentage of monomers in the polymer equal 100%. This polymer preferably has a weight average molecular weight ranging from about 1,000 to 20,000.

One particularly preferred silane acrylic polymer contains about 10% by weight styrene, about 65% by weight gamma-methacryloxypropyl trimethoxysilane, about 20% by weight of nonfunctional acrylates or methacrylates such as trimethylcyclohexyl methacrylate, butyl acrylate, and iso-butyl methacrylate and any mixtures thereof, and about 5% by weight of hydroxy propyl acrylate.

These hydroxy functional silane materials can also be oligomeric in nature. These materials are well known in that art.

Mixtures of polymeric and oligomeric high hydroxy functional silane compounds may also be utilized in the present invention.

In addition to the above components in the coating composition, other film-forming and/or crosslinking solution polymers may be included in the present application. Examples include conventionally known acrylics, cellulosics, isocyanates, blocked isocyanates, urethanes, polyesters, epoxies or mixtures thereof. One preferred optional film-forming polymer is a polyol, for example an acrylic polyol solution polymer of polymerized monomers. Such monomers may include any of the aforementioned alkyl acrylates and/or methacrylates and in addition, hydroxy alkyl acrylates and/or methacrylates. Suitable alkyl acrylates and methacrylates have 1-12 carbon atoms in the alkyl groups. The polyol polymer preferably has a hydroxyl number of about 50-200 and a weight average molecular weight of about 1,000-200,000 and preferably about 1,000-20,000.

To provide the hydroxy functionality in the polyol, up to about 90% preferably 20 to 50%, by weight of the polyol comprises hydroxy functional polymerized monomers. Suitable monomers include hydroxy alkyl acrylates and methacrylates, for example, such as the hydroxy alkyl acrylates and methacrylates listed hereinabove and mixtures thereof.

Other polymerizable non-hydroxy-containing monomers may be included in the polyol polymer component, in an amount up to about 90% by weight, preferably 50 to 80%. Such polymerizable monomers include, for example, styrene, methylstyrene, acrylamide, acrylonitrile, methacrylonitrile, methacrylamide, methylol methacrylamide, methylol acrylamide, and the like, and mixtures thereof.

One example of an acrylic polyol polymer comprises about 10-20% by weight of styrene, 40-60% by weight of alkyl methacrylate or acrylate having 1-6 carbon atoms in the alkyl group, and 10-50% by weight of hydroxy alkyl acrylate or methacrylate having 1-4 carbon atoms in the alkyl group. One such polymer contains about 15% by weight styrene, about 29% by weight iso-butyl methacrylate, about 20% by weight 2-ethylhexyl acrylate, and about 36% by weight hydroxy propylacrylate.

In addition to the above components, a dispersed polymer may optionally be included in the coating composition. Polymers dispersed in an organic (substantially non-aqueous) medium have been variously referred to, in the art, as a non-aqueous dispersion (NAD) polymer, a non-aqueous microparticle dispersion, a non-aqueous latex, or a polymer colloid. See generally, Barrett, DISPERSION POLYMERIZATION IN ORGANIC MEDIA (John Wiley 1975). See also U.S. Pat. Nos. 4,147,688; 4,180,489; 4,075,141; 4,415,681; 4,591,533; and 5,747,590, hereby incorporated by reference. In general, the non-aqueous dispersed polymer is characterized as a polymer particle dispersed in an organic media, which particle is stabilized by what is known as steric stabilization.

According to the prior art, steric stabilization is accomplished by the attachment of a solvated polymeric or oligomeric layer at the particle-medium interface.

The dispersed polymers are known to solve the problem of cracking typically associated with top coatings, particularly coatings containing silane compounds, and are used in an amount varying from about 0 to 30% by weight, preferably about 10 to 25%, of total weight of resin solids in the composition. The ratio of the silane compound to the dispersed polymer component of the composition suitably ranges from 5:1 to 1:3, preferably 2:1 to 1:2. To accommodate these relatively high concentrations of dispersed polymers, it is desirable to have reactive groups (e.g., hydroxy groups) on the solvated portion of the dispersed polymer, which reactive groups make the polymers compatible with the continuous phase of the system.

A preferred composition for a dispersed polymer that has hydroxy functionality comprises a core consisting of about 25% by weight of hydroxyethyl acrylate, about 4% by weight of methacrylic acid, about 46.5% by weight of methyl methacrylate, about 18% by weight of methyl acrylate, about 1.5% by weight of glycidyl methacrylate to provide a crosslinked core and about 5% of styrene. The solvated arms that are attached to the core contain 97.3% by weight of a pre-polymer and about 2.7% by weight of glycidyl methacrylate, the latter for crosslinking or anchoring of the arms. A preferred pre-polymer contains about 28% by weight of butyl methacrylate, about 15% by weight of ethyl methacrylate, about 30% by weight of butyl acrylate, about 10% by weight of hydroxyethyl acrylate, about 2% by weight of acrylic acid, and about 15% by weight of styrene.

The dispersed polymer can be produced by well known dispersion polymerization of monomers in an organic solvent in the presence of a steric stabilizer for the particles. The procedure has been described as one of polymerizing the monomers in an inert solvent in which the monomers are soluble but the resulting polymer is not soluble, in the presence of a dissolved amphoteric stabilizing agent.

A curing catalyst is typically added to catalyze the curing (i.e., crosslinking) reactions between the reactive components present in the composition. A wide variety of catalysts can be used, such as dibutyl tin dilaurate, dibutyl tin dilaurate, dibutyl tin diacetate, dibutyl tin dioxide, dibutyl tin dioctoate, tin octoate, aluminum titanate, aluminum chelates, zirconium chelate and the like. Sulfonic acids, such as dodecylbenzene sulfonic acid, either blocked or unblocked, are effective catalysts. Alkyl acid phosphates, such as phenyl acid phosphate, either blocked or unblocked, may also be employed. Any mixture of the aforementioned catalysts may be useful, as well. Other useful catalysts will readily occur to one skilled in the art. Preferably, the catalysts are used in the amount of about 0.1 to 5.0%, based on the total weight of the binder.

To improve the weatherability especially of a clear finish produced by the present coating composition, an ultraviolet light stabilizer or a combination of ultraviolet light stabilizers can be added to the topcoat composition in the amount of about 0.1-10% by weight, based on the total weight of the binder. Such stabilizers include ultraviolet light absorbers, screeners, quenchers, and specific hindered amine light stabilizers. Also, an antioxidant can be added, in the about 0.1-5% by weight, based on the total weight of the binder. Typical ultraviolet light stabilizers that are useful include benzophenones, triazoles, triazines, benzoates, hindered amines and mixtures thereof.

A suitable amount of water scavenger such as trimethyl orthoacetate, triethyl orthoformate, tetrasilicate and the like (pref. 2 to 6% by weight of binder) is typically added to the topcoat composition for extending its pot life. Aged paint may also lose its silane activity for primerless windshield sealant adhesion compatibility, due to moisture-initiated silane hydrolysis and condensation. It is believed that the presence of a moisture scavenger such as trimethyl orthoacetate could inhibit such a process by reacting with water and forming methanol and butyl acetate. Such reaction products do not hurt the silane activity. In fact, in-situ generated alcohol such as methanol may even help the silane groups to work against the alcohol-exchange reaction with acrylic polyols typically present in the coating composition. The alcohol-exchange reaction, if allowed to proceed, tends to negatively impact the crosslink density of the coating film.

About 3% microgel (preferably acrylic) and 1% hydrophobic silica may be employed for rheology control. The composition may also include other conventional formulation additives such as flow control agents, for example, such as Resiflow® S (polybutylacrylate), BYK® 320 and 325 (high molecular weight polyacrylates).

When the present composition is used as a clearcoat (topcoat) over a pigmented colorcoat (basecoat), small amounts of pigment can be added to the clearcoat to eliminate undesirable color in the finish such as yellowing.

The pigments can be introduced into the coating composition by first forming a mill base or pigment dispersion with any of the aforementioned polymers used in the coating composition or with another compatible polymer or dispersant by conventional techniques, such as high speed mixing, sand grinding, ball milling, attritor grinding or two roll milling. The mill base is then blended with the other constituents used in the coating composition.

Conventional solvents and diluents are used as the liquid carrier to disperse and/or dilute the above mentioned polymers to obtain the present coating composition. Typical solvents and diluents include toluene, xylene, butyl acetate, acetone, methyl isobutyl ketone, methyl ethyl ketone, methanol, isopropanol, butanol, hexane, acetone, ethylene glycol, monoethyl ether, VM and P naptha, mineral spirits, heptane and other aliphatic, cycloaliphatic, aromatic hydrocarbons, esters, ethers and ketones and the like.

The coating composition of this invention is typically formulated as a one-package system although two-package systems are possible as will occur to one skilled in the art. The one-package system has been found to have extended shelf life.

The present invention is also directed to a method for forming a multi-layer two-tone composite finish on a variety of substrates, especially on portions of transportation vehicles such as automobile, truck, airplane, and vessel bodies and parts thereof, utilizing a coating composition based upon the present invention. The process of the present invention can be run in a batch or continuous process. Ideally, it is designed to be run in existing primer surfacer/basecoat/clearcoat painting facilities, such as continuous in-line or modular batch facilities, located at an automotive assembly plant without the need for double processing of a vehicle through the paint line or the need to extend the painting time.

The coating composition of the present invention is particularly useful when utilized in coating processes that provide attractive multiple colored two-tone chip resistant finishes on transportation vehicle exteriors such as such as an automotive, truck, airplane, or vessel bodies or parts thereof.

FIG. 1 illustrates the use of an embodiment of the present invention in such a process. This process enables a two-tone finish utilizing a three wet coat integrated first stage, which is cured, followed by a second stage in which a colored basecoat and clearcoat are applied as a composite and cured. This finished substrate also has excellent chip resistance, as well as adhesion, intercoat adhesion, appearance, and other desired film properties.

Referring to FIG. 1, in step 2, an electrocoated vehicle substrate enters a two-tone coating scenario, wherein a hold-out capable chip resistant curable coating composition is applied to an accent area such as the lower body of the vehicle substrate, step 4. Subsequently, in step 6, a second curable primer surfacer coating is then applied to the non-accent area, and in step 8 an accent color basecoat coating, typically a solventborne color basecoat, is applied to the aforementioned holdout capable chip resistant curable coating layer. The above wet-on-wet accent area layers, as well as the primed non-accent areas are then cured in step 10, at an effective time and temperature combination.

Referring once again to FIG. 1, after curing, in step 12 the color coated accent area is covered with a protective membrane and secured in place. The main body color basecoat, typically a waterborne basecoat, is then applied to the vehicle substrate per step 14. The color coated accent area is then uncovered in step 16, a clearcoat is applied to the entire outer substrate of the vehicle per step 18, and the composite coating is cured in step 20.

Figure 2:
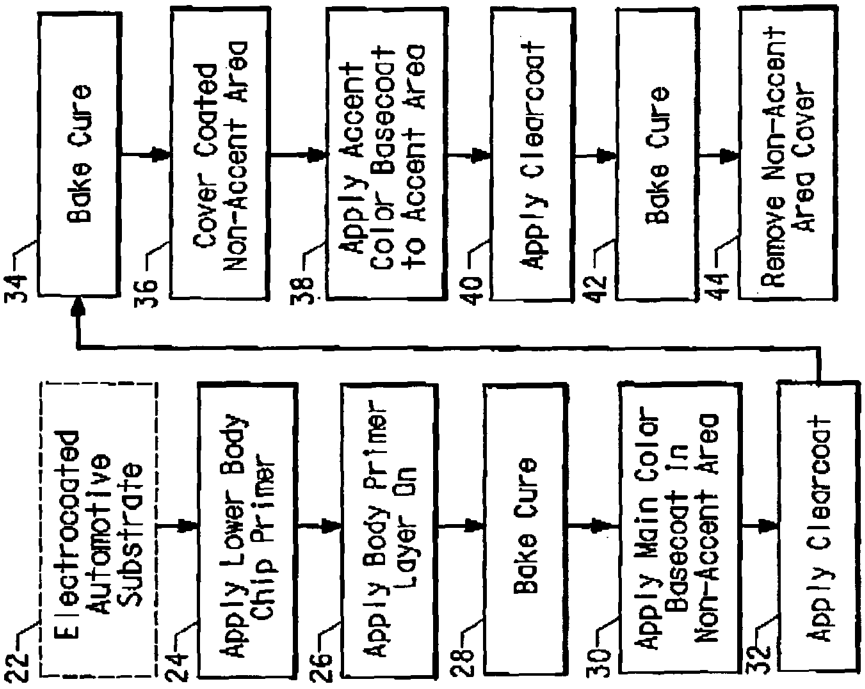
FIG. 2 (Prior Art)
FIG. 2 is a general flow diagram of a conventional two-tone coating method.

While the clearcoats of the present invention can be used in a conventional two-tone painting process as described above and shown in FIG. 2, they are most desirably employed in the improved two-tone painting process of the present invention as shown in FIG. 1, which operates using less coating steps and curing cycles. In order to illustrate the advantage of the improved process shown in FIG. 1 over the conventional technique, refer to FIG. 2. As FIG. 2 indicates, a lower body chip resistant primer is applied over an electrocoated vehicle substrate in steps 22 and 24. Then a primer surfacer is applied to the entire substrate per step 26, and the chip resistant and primer layers are cured, step 28. In steps 30 and 32, a main color basecoat is applied to the non-accent area of the vehicle substrate, and clearcoat is then applied. The layers are then bake cured and covering with a protective membrane, per steps 34 and 36. An accent color basecoat is then applied to the accent area of the vehicle substrate, and clearcoated in accordance with steps 38 and 40. Finally, the accent color basecoat/clearcoat finish is bake cured, and the protective membrane removed, steps 42 and 44.

The conventional two-tone method therefore consists of a total of 6 coating steps and 3 bake curing steps. In the first embodiment of the improved process described herein, a two-tone chip resistant finish is achieved in 5 coating steps and 2 bake-curing steps. In the second embodiment of the improved process, the finish is achieved in 4 coating steps and 2 bake-curing steps. Moreover, the improved process overcomes several practical disadvantages that arise using the conventional two-tone procedure. The conventional procedure requires two separate clearcoating steps, one additional bake curing cycle, and most notably, the requirement to pass the vehicle substrate through existing basecoat/clearcoat finishing stages on two separate occasions tying up the vehicle assembly line and producing a production bottleneck. This last disadvantage is time consuming, energy demanding, and not cost effective.

Figure 3:
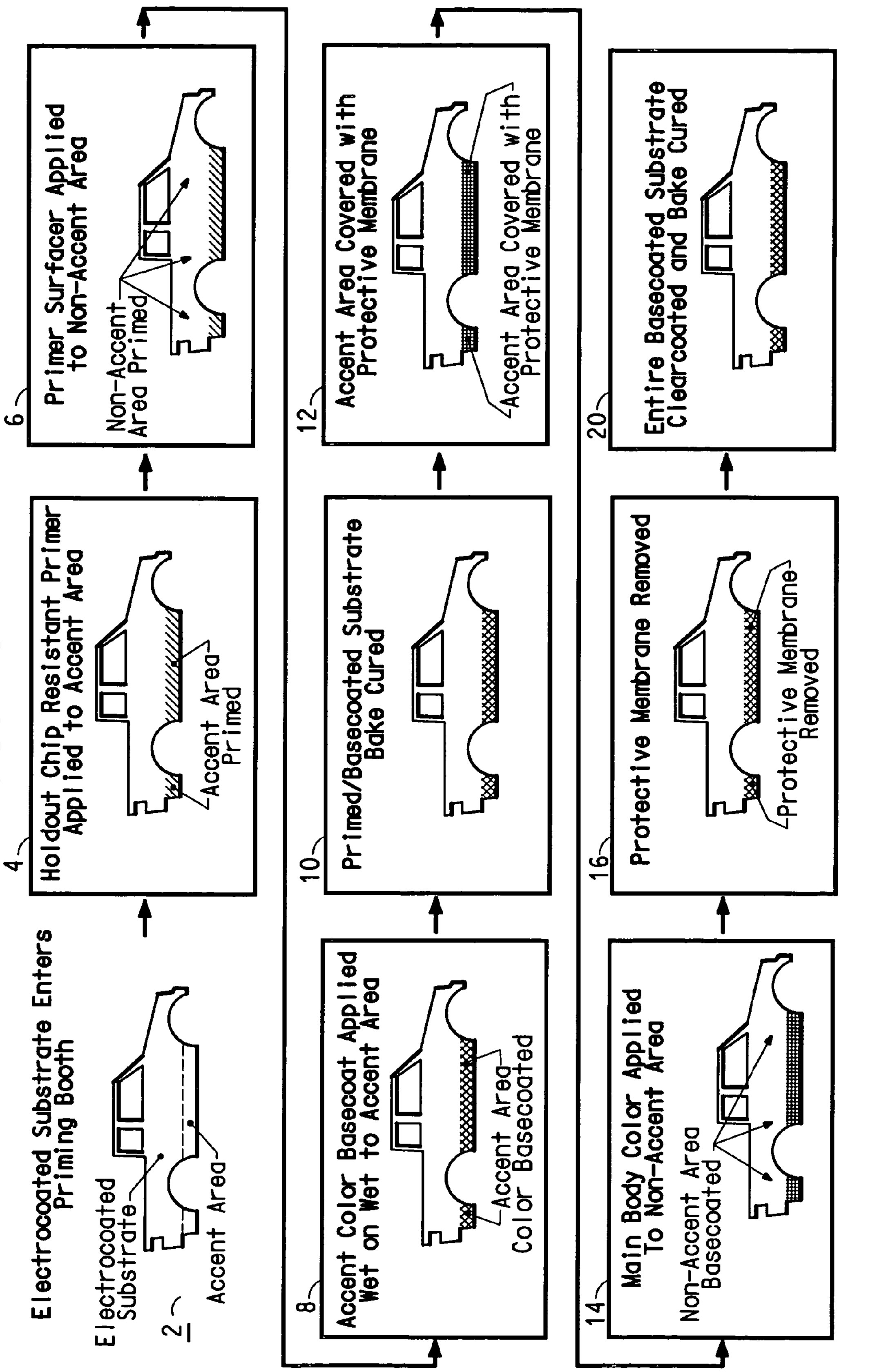
FIG. 3 is a graphic illustration of a process for applying a two-tone finish on a vehicle substrate featuring the use of an embodiment of present invention.

FIG. 3 is a graphic representation which further illustrates the use of the embodiment of the present invention, as described in FIG. 1, to produce a two-tone finish utilizing a three wet coat integrated first stage.

Referring to FIG. 3 (which uses the same reference numerals as used in FIG. 1), an electrocoated vehicle substrate enters a primer-coating booth, step 2, wherein a holdout capable chip resistant curable coating composition is applied to an accent area of the vehicle substrate, step 4. Then a second curable primer surfacer coating is then applied to the non-accent area in step 6. In step 8 an accent color basecoat coating is applied over the previously applied capable chip resistant curable coating layer. The above wet-on-wet-on wet layers are cured in step 10.

As FIG. 3 further illustrates, after curing, in step 12 the color coated accent area is covered with a protective membrane and secured in place. The main body color basecoat is then applied to the vehicle substrate per step 14, and the protective membrane removed, step 16. A clearcoat is then applied to the entire outer substrate of the vehicle (not shown in FIG. 3) and the composite coating is baked cured, step 20.

In an alternative method of the present invention, the aforementioned holdout capable chip resistant curable coating composition can be also used as the main body primer surfacer. Referring again to FIG. 3, the primer would be applied to the entire vehicle, combining steps 4 and 6. This scenario may be considered a wet-on-wet application method.

The nature of the chip resistant primer, basecoat, or primer surfacer composition used in conjunction with a coating composition based on the present invention is in no way critical to the present invention, except that the chip resistant primer must have holdout capability mentioned above. Any of a wide variety of commercially available automotive chip resistant primers with hold out capability, basecoats, or primer surfacer compositions may be employed in the present invention, including standard solvent borne, waterborne or powdered based systems. High solids chip resistant primers, solvent borne basecoats, and primer surfacers which have low VOC (volatile organic content) and meet current pollution regulations are more commonly employed. Typically useful hold out capable chip resistant primers are those disclosed in U.S. patent application Ser. No. 10/688,616 filed Oct. 17, 2003, hereby incorporated by reference. Any conventional solventborne or waterborne basecoats can be applied. Suitable solventborne basecoats are well known to those skilled in the art, for e.g., those taught in Wada et al U.S. Pat. No. 6,395,340, hereby incorporated by reference. Any conventional waterborne basecoats can be applied. Typically these are aqueous dispersions of an acrylic polymer and an alkylated melamine formaldehyde crosslinking agent. Useful compositions are taught in Backhouse U.S. Pat. No. 4,403,003 and Nickle et al U.S. Pat. No. 5,314,945, which are hereby incorporated by reference.

The flash times between wet coats and bake curing time and temperatures will be readily apparent to those of skill in the art, and may be controlled by the specific coating chemistry or formulations. Generally though, flash times between uncured wet coats can range from about 15 seconds to 10 minutes, bake curing temperatures can range from about 100° C. to 160° C., and cure times can range from about 15 to 45 minutes.

The thickness of the cured composite two-tone finish is generally from about 50 to 275 μm (2 to 12 mils) and preferably about 100 to 200 μm (4 to 8 mils). The primers, basecoats, and clearcoat are preferably applied and cured to have thicknesses from about 10 to 50 μm (0.4 to 2.0 mils), about 10 to 50 μm (0.4 to 2.0 mils), and about 25 to 75 μm (1.0 to 3.0 mils), respectively.

Such finishes provide automobiles and trucks with a mirror-like exterior finish having an attractive aesthetic appearance, including high gloss and DOI (distinctness of image), and substantially wrinkle free appearance.

EXAMPLES

The invention is further described in the following examples. The examples are merely illustrative and do not in any way limit the scope of the invention as described and claimed. All parts and percentages in the examples are on a weight basis unless otherwise indicated.

The following resins were prepared and used as indicated in Clearcoat Examples 1-2 and Comparative Examples 3 and 4.

Resin Example 1

Preparation of Carbamate Functional Oligomer for Use in Clearcoat Examples

A carbamate functional oligomer was prepared by charging the following ingredients into a reaction flask equipped with a heating mantle, stirrer, thermometer, nitrogen inlet and a reflux condenser:

| | Parts by Weight (g) |
|---|---|
| Portion I | |
| Isocyanurate of hexane diisocyanate (Desmodur ® 3300 from Bayer Corporation) | 1608 |
| Aromatic 100 Solvent (from Exxon Mobil Chemical Co) | 707 |
| Dibutyl tin dilaurate | 0.3 |
| Portion II | |
| Cyclohexanol | 783 |
| 2-Ethyl hexanol | 68 |
| Portion III | |
| Butanol | 347 |
| Total | 3513 |

Portion I was pre-mixed and charged into the reaction flask and heated to 100° C. under agitation and a nitrogen blanket. Then Portion II was added over a 120 minute period, in order to keep the exotherm temperature at or below 103-107° C. The reaction mixture was then held at 100° C. while mixing until essentially all of the isocyanate was reacted as indicated by infrared scan. After NCO in the IR absorbance plot is no longer detected, the reaction mixture was cooled to below 100° C. and Portion III was then added to adjust the solids content of the resulting solution to 70% by weight solids.

The resulting solution contained the following constituents HDI trimer/Cyclohexanol/2-Ethyl Hexanol in a weight ratio of 65/32/3.

Resin Example 2

Preparation of Hydroxy Functional Silane Polymers 1-2 for Use in Clearcoat Examples Acrylosilane polymer solutions were prepared by copolymerizing in the presence of a 2/1 Solvesso 100 Aromatic Solvent/butanol mixture, monomer mixtures of styrene (S), hydroxypropyl acrylate (HPA), methacryloxypropyl trimethoxy silane (MAPTS) (Silquest® A-174 from Crompton), butyl acrylate (BA), and isobutyl methacrylate (IBMA) in the presence of 8 parts by weight of Vazo® 67. The resulting polymer solution has a 71% solids content and a viscosity of F-R on the Gardner Holdt scale measured at 25° C. The polymer compositions are described in Table 1 and they all have a weight average molecular weight of approximately 4,500 gram/mole.

TABLE 1

| | Silane Polymer 1 | Silane Polymer 2 |
|---|---|---|
| HPA | 20 | 10 |
| MAPTS | 30 | 65 |
| Sty | 25 | 10 |
| IBMA | 23 | 12 |
| BA | 2 | 3 |

Resin Example 3

Preparation of an Acrylic Microgel for Use in Clearcoat Examples

A methyl methacrylate/glycidyl methacrylate copolymer was prepared as an intermediate stabilizing polymer used in the synthesis of the below acrylic microgel resin. This stabilizing polymer was prepared by charging the following to a nitrogen blanketed flask equipped as above:

| | Parts by Weight (g) |
|---|---|
| Portion I | |
| n-Butyl acetate | 195.800 |
| Portion II | |
| Methyl methacrylate | 139.000 |
| n-Butyl acetate | 14.410 |
| Glycidyl methacrylate | 13.060 |
| Glycidyl methacrylate/12-Hydroxystearic acid copolymer (60% by weight solids solution of 89.2% 12-HAS/10.8% GMA in a 80/20 blend of toluene and petroleum naphtha) | 181.660 |
| Petroleum Naphtha (Exxsol ® D-3135 from Exxon) | 40.570 |
| n-Butyl acetate | 13.060 |
| Portion III | |
| 2,2'-azobis(2-methylbutyronitrile) (Vazo ® 67 from DuPont) | 8.010 |
| n-Butyl acetate | 71.590 |
| Petroleum Naphtha (Exxsol ® D-3135 from Exxon) | 74.330 |
| Portion IV | |
| 4-tert-Butyl catechol | 0.040 |
| n-Butyl acetate | 2.690 |
| Portion V | |
| Methacrylic acid | 2.710 |
| n-Buyl acetate | 6.020 |
| Potion VI | |
| N,N'-dimethyl dodecyl amine | 0.360 |
| n-Butyl acetate | 2.690 |
| Total | 766 |

Portion I was charged to the reactor and brought to a temperature of 96 to 100° C. Portions II and III were separately premixed and then added concurrently over a 180 minute period, while maintaining a reaction temperature of 96 to 100° C. The solution was then held for 90 minutes. In sequence, Portions IV, V, and VI were separately premixed and added to the reactor. The reaction solution was then heated to reflux and held until the acid number is 0.5 or less. The resulting polymer solution has a 40% solids content.

The acrylic microgel resin was then prepared by charging the following to a nitrogen blanketed flask equipped as above:

| | Parts by Weight (g) |
|---|---|
| Portion I | |
| Methyl methacrylate | 15.187 |
| Mineral spirits (Exxsol ® D40 from Exxon) | 97.614 |
| Methyl methacrylate/Glycidyl methacrylate Stabilizer copolymer (prepared above) | 4.678 |
| Heptane | 73.638 |
| 2,2'-azobis(2-methylbutyronitrile) (Vazo ® 67 from DuPont) | 1.395 |
| Portion II | |
| N,N-dimethylethanolamine | 1.108 |
| Methyl methacrylate | 178.952 |
| Methyl methacrylate/Glycidyl methacrylate stabilizer copolymer (prepared above) | 58.271 |
| Glycidyl methacrylate | 2.816 |
| Methacrylic acid | 2.816 |
| Styrene | 75.302 |
| Hydroxy Ethyl Acrylate | 23.455 |
| Heptane | 198.512 |
| Mineral Spirits (Exxsol ® D40 from Exxon) | 32.387 |
| Portion III | |
| 2,2'-azobis(2-methylbutyronitrile) (Vazo ® 67 from DuPont) | 2.024 |
| Toluene | 12.938 |
| Heptane | 30.319 |
| Portion IV | |
| Heptane | 9.588 |
| Portion V | |
| Resimene ® 755 | 246.3 |
| Total | 1067.3 |

Portion I was charged into the reaction vessel, heated to its reflux temperature, and held for 60 minutes. Portions II and III were premixed separately and then added simultaneously over a 180 minute period to the reaction vessel mixed while maintaining the reaction mixture at its reflux temperature. Portion IV was then added. The reaction solution was then held at reflux for 120 minutes and then 246.3 pounds of the solvent was stripped. The resin was then cooled to 60° C. and mixed with Portion V. Mixing was continued for 30 minutes.

The resulting polymer solution has a weight solids of 70%, and a viscosity of 50 centipoise (By Brookfield Model RVT, Spindle #2, at 25° C.).

Clearcoat Examples 1-2 and Comparative Examples 3-4

Preparation of Clearcoat Compositions

Four clearcoat compositions were prepared by blending together the following ingredients in the order given:

TABLE 2

| | Ex. 1 | Ex. 2 | C. Ex. 3 | C. Ex. 4 |
|---|---|---|---|---|
| Microgel[1] | | 3% | | 3% |
| Melamine[2] | 22% | | | |
| Melamine[3] | | 22% | | 17% |
| Melamine[4] | | | 17% | 5% |
| Melamine[5] | | | 5% | |
| HALS Tinuvin 123[6] | 1% | 1% | 1% | 1% |
| UVA Tinuvin 928[7] | 2% | 2% | 2% | 2% |
| NAD[8] | 18% | 15% | 24% | 19% |
| Catalyst[9] | 1% | 1% | 1% | 1% |
| Flow Aid[10] | 0.31% F.w. | 0.31% F.w. | 0.31% F.w. | 0.31% F.w. |
| Silica Dispersion[11] | 10% F.w | 10% F.w | 10% F.w | 10% F.w |
| Moisture | 2% | 2% | 2% | 2% |
| Scalvenger[12] | F.w. | F.w. | F.w. | F.w. |
| Urethane Oligomer[13] | 18% | 15% | | |
| Silane Polymer 1 | 32% | 30% | 44% | 46% |
| Silane Polymer 2 | | 5% | | |
| Solvent[14] | 3% F.w. | 3% F.w. | 3% F.w. | 3% F.w. |

Table Footnotes

*All the numbers in this table are by % non-volatile, except for those noted as f.w. which means by formula weight.

[1]Resin Example 3.

[2]Resimene ® 4514 intermediate melamine supplied by Surface Specialties UCB, St. Louis, MO.

[3]Cymel ® 1161 monomeric melamine supplied by Cytec Industries Inc., West Patterson, New Jersey.

[4]Cymel ® 1168 monomeric melamine supplied by Cytec Industries Inc., West Patterson, New Jersey.

[5]Resimene ® 717 polymeric melamine supplied by Surface Specialties,

[6]Tinuvin ® 123 supplied by Ciba Specialty Chemicals, Tarrytown, New York.

[7]Tinuvin ® 928 supplied by Ciba Specialty Chemicals, Tarrytown, New York.

[8]Non-aqueous dispersion resin (NAD) prepared in accordance with the procedure described in the U.S. Pat. No. 5,747,590 at column 8, lines 46-68 and column 9, lines 1-25, all of which is incorporated herein by reference.

[9]Dodecyl benzene sulfonic acid salt of 2-amino-2-methyl-1-propanol supplied by King Industries, Norwalk, Connecticut.

[10]Disparlon LC-955, King Industries, Norwalk, CT.

[11]Aersil R-805 Grind (from Degussa, Parsippany, New Jersey)

[12]Trimethyl orthoacetate supplied by Chem Central, Bedford Park, IL.

[13]Resin Example 1.

[14]Butanol, supplied by Chem Central, Bedford Park, IL.

Process Simulation and Paint Results

The coating compositions of Clearcoat Examples 1 and 2 and Comparative Examples 3 and 4 were reduced to 38 seconds on a #4 Ford cup with ethyl 3-ethoxy propionate (EEP). These reduced clearcoat samples were bell-sprayed to either a waterborne black base-coat or a solvent-borne silver metallic base-coat over a steel substrate which was already coated with a layer each of electro-coat and primer surfacer. The waterborne Ebony basecoat is commercially available from DuPont under DuPont Code of 686S40343, and the solvent-borne Silver is also commercially available from DuPont under DuPont Code of 647A01147. The primer surfacer used is commercially available from DuPont under DuPont Code of 554-DN082. The electrocoat used is commercially available from DuPont under the name of ED5050.

The basecoats were generally applied in two coats by bell with 60 seconds flash in between over a primed, electrocoated steel substrate under a booth condition of 75° F. and 55% humidity.

For physical property tests such as scratch resistance and adhesion to windshield adhesives, the clear compositions were applied to the Ebony base-coated panels after 5-minute basecoat flash at room temperature. The applied clearcoat was allowed to flash in air for approximately 10 minutes before baking. All the clearcoat Examples 1-2 were baked at 140° C. for 20 minutes. The final dry film thickness was 15-20 microns for the base-coats and 40 to 50 microns for the clear-coats.

For scratch resistance tests, all the baked samples were allowed to age for at least 24 hours. Fracture energy and plastic deformation were measured by a nano-scratch test method published by Ford Motor Co. (PA-0171).

For primeness MVSS windshield sealant adhesion tests, within 12 hours of bake, a bead of windshield adhesive was applied to the clearcoat surface primerless (quick knife adhesion test according to GM4352M and GM9522P specifications published by General Motors Corporation). The windshield adhesive used is commercially available from Dow Essex Specialty Products Company and is identified as Betaseal™ 15626.

The windshield adhesive bead was allowed to cure for 72 hours at 73° F. (23° C.) and 50% humidity. The size adhesive beads were about 6×6×250 mm and the cured beads were cut with a razor blade. The interval between the cuts was at least 12 mm apart. The desirable result is 100% cohesive failure (CF) of the adhesive beads, rather than a failure due to a loss of adhesion between the adhesive and the clearcoat or within the clearcoat or underlayers. The results for Examples 1-2 and Comparative Examples 3 and 4 are reported in Table 3, below.

For appearance evaluation over solvent-borne base-coat, the clear compositions of Examples 2 and 4 were applied to the Silver metallic base-coated panels after a 5-minute base-coat flash at room temperature. The final composites of wet basecoats and clearcoats were horizontally baked at 140° C. for 30 minutes. The final dry film thickness was 15-20 microns for the base-coats and 45-50 microns for the clear-coats. The appearances of the panels were measured by QMS (Quality Measurement Systems from Autospec America) which provides a combined measurement of gloss, distinctness of image, and orange peel. Typical QMS numbers for automotive finishes are 40-75 with higher numbers meaning better appearance.

To simulate the wet-on-wet two-tone process, a chip resistant solvent-borne primer coating composition (1143A01239, commercially available from DuPont) was Bell sprayed over halves of steel substrates (12×12 inch$^2$) which was already coated with a layer of electrocoat, with the other halves of the substrate covered with an aluminum foil. After 2 minutes of flash of the primer, a layer of solvent-borne Arizona Beige (coded as 647S40330, commercially available from DuPont) was applied by bell wet-on-wet over the wet primer surface. After five more minutes of flash, the aluminum foil was removed and the wet-on-wet (WOW) panel was baked at 165° C. for 30 minutes. The dry thickness of the primer and basecoat was 25 and 15 microns respectively. Covering the half of baked wet-on-wet substrate with aluminum foil, a primer surfacer (commercially available from DuPont under DuPont Code of 554-DN082) was applied to the remaining half of the electro-coated substrate. After 10 minute of primer surfacer flash, the panel was baked at 150° C. for 30 minutes to achieve a dry filmbuild of 25 microns. To the baked primer surfacer, a waterborne Ebony basecoat (commercially available from DuPont under DuPont Code of 686S40343) was bell applied sprayed at 55% humidity to a dry film build of 15-20 microns, followed by a 3-minute room temperature flash, 3-minute heated flash at 80° C., and 30 minutes further flash at room temperature. The aluminum foil covering the wet-on-wet substrate is then removed. To the whole steel panel substrate, the clear-coat compositions were then sprayed by bell to a dry film build of 40-50 microns. After 10 minutes of clear-coat flash, panels were horizontally baked under several under-bake conditions for 10 minutes: 125° C., 130° C., and 135° C. The clears over the wet-on-wet halves of the panels were cut and exposed for Cleveland humidity and Xenon exposure before the adhesion tests. The clears over the half of primer surface covered with Ebony waterborne basecoat were measured for appearance. The appearances of the panels were measured by QMS (Quality Measurement Systems from Autospec America) which provides a combined measurement of gloss, distinctness of image, and orange peel. Typical QMS numbers for automotive finishes are 45-80 with higher numbers meaning better appearance.

The Cleveland humidity tests were conducted according to the test method described by Ford (BQ 104-02). For the convince of comparison, the Cleveland humidity chamber was set at 60° C. and the panels will be exposed to the chamber for 16 hours before tested for clear-coat adhesion over the pre-baked wow substrates. The test protocol was following Method "B" of FLTM BI 106-01 published by Ford Motor Company.

The Xenon exposure was conducted according to Ford specification published as SAEJ1960. The Xenon exposed panels would be immersed in a 32+/−1° C. water bath for 16 h (FLTM BI 104-01) and followed with adhesion tests according to Method "B" of FLTM BI 106-01 published by Ford Motor Company.

The results of appearance, nano-scratch, primeness MVSS compatibility, and clear-coat adhesion to the WOW substrates are summarized in Table 3:

TABLE 3

| | | | | | | | CC Adh to WOW Substrates | | | | | |
|---|---|---|---|---|---|---|---|---|---|---|---|---|
| | Appearance* | | 8-week | | Nano-Scratch | | CC Bake for | | CC Bake for | | CC Bake for | |
| Clear- | Over | Over | Jacksonville | Primerless | | Plastic | 10' × 255° F. | | 10' × 265° F. | | 10' × 275° F. | |
| coat | WBBC | SBBC | Etch Rating** | MVSS | Fract. E. | Deform | CHC | Xenon | CHC | Xenon | CHC | Xenon |
| Ex. 1 | 60 | 37 | 4.9 | 100% CF | 12 mN | 0.30 | 100% | 100% after 6000 h | 100% | 100% after 6000 h | 100% | 100% after 6000 h |
| Ex. 2 | 47 | 64 | 5 | 100% CF | 12 mN | 0.30 | 100% | 100% after 6000 h | 100% | 100% after 6000 h | 100% | 100% after 6000 h |
| C. Ex. 3 | 60 | 37 | 5.4 | 100% CF | 8 mN | 0.36 | 0% | 0% after 1500 h | 95% | 0% after 2500 h | 100% | 0% after 3000 h |
| C. Ex. 4 | 37 | 65 | 5.2 | 100% CF | 9.5 mN | 0.34 | 100% | 0% after 3000 h | 100% | 0% after 3500 h | 100% | 0% after 4000 h |

Table Footnotes
*Scale of 1-100: the higher the QMS number, the better the appearance.
**Average of 10 Panels exposed in the summer of 2004 at Jacksonville, Florida for 14 weeks of acid rain exposure. The exposed panels were rated for a severity rating of 0-10, with 0 meaning zero etch and 10 meaning very severe etch spots were produced.

As Table 3 shows, clear Example 1 showed equivalent performance to the control Example 3 in appearance and primerless MVSS compatibility, but equal or better etch resistance than the control. The major advantages of the clearcoat examples 1 over the control example 3 are their largely improved fracture energy and plastic deformation for scratch and mar resistance. Also, examples 1 showed excellent adhesion over the baked wet-on-wet primer-basecoat substrates while the control examples failed, especially after Xenon exposure. Above examples demonstrated that with the use of high hydroxy dual fucntional silane in the carbamate system, hybrid cure of carbamate and hydroxy crosslinking with melamine, with the help of silane condensation, clearcoats of excellent appearance and physical properties can be achieved with both waterborne and solventborne basecoats. Such properties included etch and mar resistance, primeness MVSS compatibility and adhesion over the baked basecoat-to-primer wet-on-wet substrates. Also, while the control example 3 which used high imino polymeric melamine (Resimene® 717: 2.3 mole of NH per triazine ring, see *Polym. Prep.* (*Am. Chem. Soc., Div. Polym. Chem*) 44(1), 259 (2003)) showed inferior performance for wet-on-wet adhesion and scratch and mar resistance, use of low imino aminoplastic resin (Resimene® 4514: 0.5 mole of NH per triazine ring) in Example 1 did not compromise the good appearance, while achieving excellent wet-on-wet adhesion and scratch and mar resistance.

Table 3 also shows that, clear Examples 2 and 4 are both good for appearance over a solventborne basecoat, but Example 4 failed the wet-on-wet adhesion for Xenon exposure though it did not contain a polymeric melamine. Also, Example 2 showed much improved scratch resistance over the example 4. Thus, a hybrid cure of hydroxy/carbamate/melamine/silane condensation has shown to offer a unique balance of overall outstanding properties.

Various other modifications, alterations, additions or substitutions to the compositions and processes of this invention will be apparent to those skilled in the art without departing from the spirit and scope of this invention. This invention is not limited by the illustrative embodiments set forth herein, but rather is defined by the following claims.

What is claimed is:

1. A method for coating a substrate to achieve a multiple color, two-tone finish, comprising:

(a) applying a holdout capable chip resistant primer coating to an accent color area of the substrate;

(b) applying a second, different primer surfacer coating to a non-accent area surface of the substrate;

(c) applying an accent color basecoat coating wet-on-wet over the holdout capable chip resistant primer in the accent color area of the substrate;

(d) curing the above composite coating of steps (a), (b) and (c) in a first bake;

(e) covering the cured accent color area with a protective membrane;

(f) applying a main color basecoat layer to the surface of the substrate;

(g) removing said protective membrane from said cured accent color area;

(h) applying a clear coat composition over said main color basecoat layer and said cured accent color area; and (i) curing the applied coatings from step (f) and (h) in a second bake, wherein the clearcoat composition used in (h) is a curable coating composition containing a film-forming binder and an organic liquid carrier; wherein the binder comprises:

a curable film-forming material having a plurality of carbamate groups;

one or more curing agents for the carbamate material comprising at least one monomeric alkylated melamine formaldehyde resin having from 0 to 1.2 moles of NH per triazine ring;

a hydroxy functional silane polymer containing at least one hydrolyzable silane group and having a hydroxyl value of 60 to 150 mg KOH/g resin; and a second hydroxy functional silane polymer containing at least one hydrolyzable silane group and having a hydroxyl value of about 44 mg KOH/g resin or less.

2. The method of claim 1 wherein said substrate is a transportation vehicle substrate.

3. The method of claim 1 wherein the hydroxyl groups on the hydroxy functional silane polymer and the second hydroxy functional silane polymer in the clearcoat are primary hydroxyl groups.

4. The method of claim 1 wherein the curable film-forming material having a plurality of carbamate groups is a carbamate functional oligomer with secondary carbamate groups.

5. The method of claim 1 wherein the curing agent component contains essentially no polymeric melamine.

6. The method of claim 1 wherein the clearcoat comprises about 45-90% by weight of a film-forming binder and about 10-55% by weight of an organic liquid carrier; and wherein:

the curable film-forming material having a plurality of carbamate groups is an oligomer or a polymer having secondary carbamate groups;

the hydroxy functional silane polymer is the polymerization product of ethylenically unsaturated monomers wherein about 5 to 80% by weight of the monomers that form the hydroxy functional silane polymer contain hydrolyzable silyl functionality;

the second hydroxy functional silane polymer is the polymerization product of ethylenically unsaturated monomers wherein about 10 to 97% by weight of the monomers that form the second hydroxy functional silane polymer contain hydrolyzable silyl functionality; and wherein the film-forming binder further comprises a non-aqueous dispersed polymer.

7. A method for coating a substrate with a coating to achieve a multiple color, chip resistant, finish, comprising:

(a) applying a holdout capable chip resistant primer coating to the surface of the substrate;

(b) applying an accent color basecoat coating wet-on-wet over the holdout capable chip resistant primer in an accent color area of the substrate;

(c) curing the composite coating of steps (a) and (b) in a first bake;

(d) covering the cured accent color area with a protective membrane;

(e) applying a main color basecoat layer to the surface of the substrate;

(f) removing said protective membrane from said cured accent color area;

(g) applying a clear coat composition over said main color basecoat layer and said cured accent color area; and (h) curing the applied coatings from steps (e) and (g) in a second bake, wherein the clearcoat composition used in (g) is a curable coating composition containing a film-forming binder and an organic liquid carrier; wherein the binder comprises:

a curable film-forming material having a plurality of carbamate groups;

one or more curing agents for the carbamate material comprising at least one monomeric alkylated melamine formaldehyde resin having from 0 to 1.2 moles of NH per triazine ring;

a hydroxy functional silane polymer containing at least one hydrolyzable silane group and having a hydroxyl value of 60 to 150 mg KOH/g resin; and a second hydroxy functional silane polymer containing at least one hydrolyzable silane group and having a hydroxyl value of about 44 mg KOH/g resin or less.

8. The method of claim 7 wherein said substrate is a transportation vehicle substrate.

9. The method of claim 7 wherein the hydroxyl groups on the hydroxy functional silane polymer and the second hydroxy functional silane polymer in the clearcoat are primary hydroxyl groups.

10. The method of claim 7 wherein the curable film-forming material having a plurality of carbamate groups is a carbamate functional oligomer with secondary carbamate groups.

11. The method of claim 7 wherein the curing agent component contains essentially no polymeric melamine.

12. The method of claim 7 wherein the clearcoat comprises about 45-90% by weight of a film-forming binder and about 10-55% by weight of an organic liquid carrier; and wherein:

the curable film-forming material having a plurality of carbamate groups is an oligomer or a polymer having secondary carbamate groups;

the hydroxy functional silane polymer is the polymerization product of ethylenically unsaturated monomers wherein about 5 to 80% by weight of the monomers that form the hydroxy functional silane polymer contain hydrolyzable silyl functionality;

the second hydroxy functional silane polymer is the polymerization product of ethylenically unsaturated monomers wherein about 10 to 97% by weight of the monomers that form the second hydroxy functional silane polymer contain hydrolyzable silyl functionality; and wherein the film-forming binder further comprises a non-aqueous dispersed polymer.

13. The method of claim 12 wherein the curing agent component contains essentially no polymeric melamine.

* * * * *